United States Patent [19]

Kemner

[11] Patent Number: 5,906,646

[45] Date of Patent: May 25, 1999

[54] SYSTEM AND METHOD FOR MANAGING ACCESS TO A RESOURCE SHARED BY A PLURALITY OF MOBILE MACHINES

[75] Inventor: Carl A. Kemner, Peoria Heights, Ill.

[73] Assignee: Caterpillar Inc., Peoria, Ill.

[21] Appl. No.: 08/774,943

[22] Filed: Dec. 19, 1996

[51] Int. Cl.[6] .............................. G05D 1/00; G01C 22/00
[52] U.S. Cl. ............................. 701/23; 701/23; 701/24; 701/50
[58] Field of Search .................. 701/23, 50, 24; 340/989, 988, 990, 991, 992, 993, 994, 909; 180/167, 168; 318/587; 395/859

[56] References Cited

U.S. PATENT DOCUMENTS

| | | | |
|---|---|---|---|
| 4,935,871 | 6/1990 | Grohsmeyer | 701/24 |
| 4,950,118 | 8/1990 | Mueller et al. | 414/274 |
| 4,979,113 | 12/1990 | Roberts et al. | 701/24 |
| 4,993,507 | 2/1991 | Ohkura | 701/23 |
| 5,091,855 | 2/1992 | Umehara et al. | 701/23 |
| 5,220,263 | 6/1993 | Onishi et al. | 701/24 |
| 5,267,173 | 11/1993 | Tanizawa et al. | 701/24 |
| 5,367,456 | 11/1994 | Summerville et al. | 701/24 |
| 5,390,125 | 2/1995 | Sennott et al. | 364/449 |
| 5,445,347 | 8/1995 | Ng | 246/169 |
| 5,586,030 | 12/1996 | Kemner et al. | 701/23 |
| 5,646,844 | 7/1997 | Gudat et al. | 701/208 |
| 5,778,327 | 7/1998 | Simmons et al. | 701/23 |

Primary Examiner—William A. Cuchlinski, Jr.
Assistant Examiner—Tim Wyckoff
Attorney, Agent, or Firm—James R. Yee

[57] ABSTRACT

A system and method for managing access to a resource by at least one mobile machine including a queue manager adapted to generate a queue position request signal as a mobile machine approaches the resource and determine if access to the resource is unsuccessful. The queue manager also generates a access status signal after access the resource. The system and method also includes a resource manager adapted to control access to the resource by the mobile machine.

23 Claims, 3 Drawing Sheets

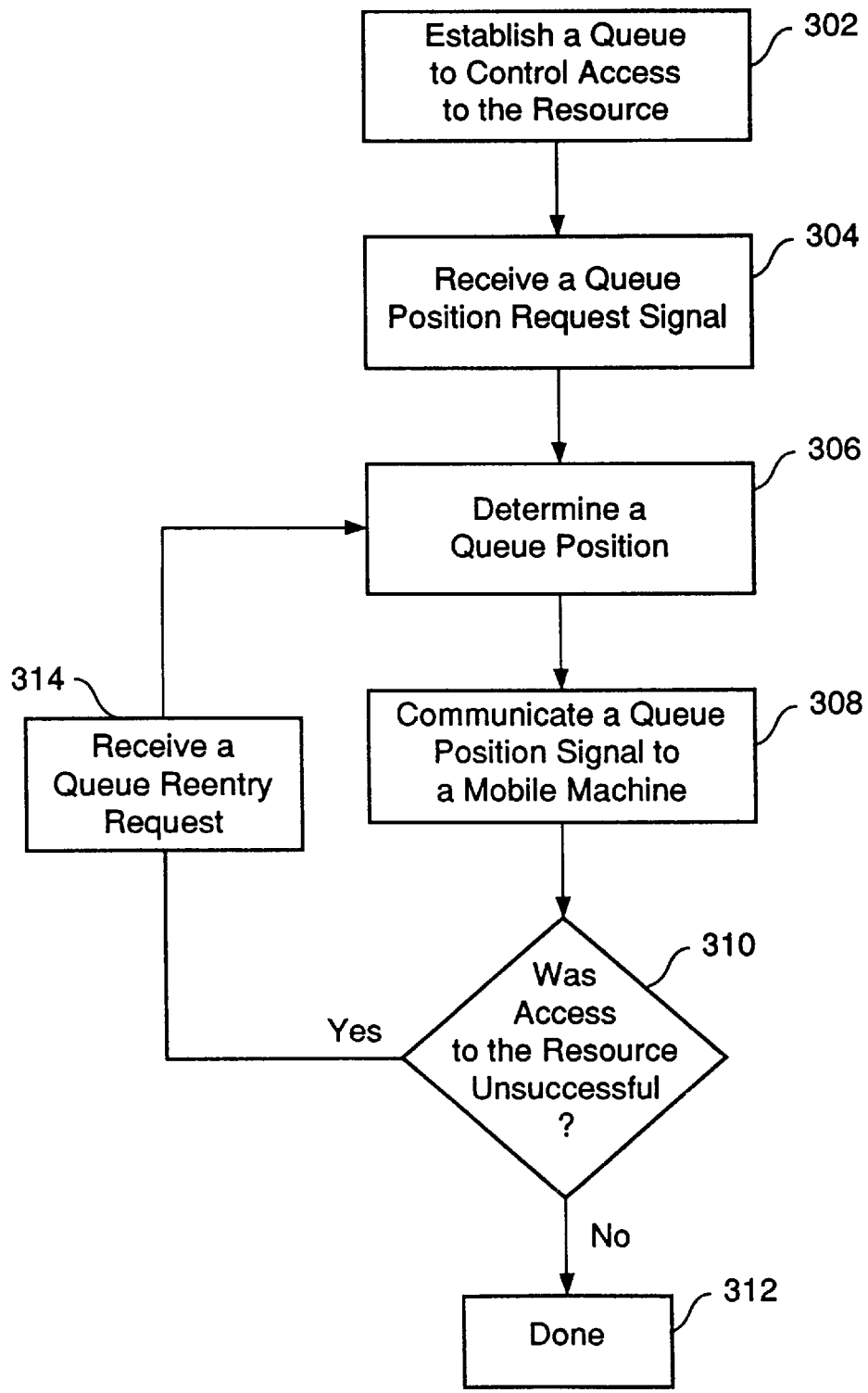

SYSTEM AND METHOD FOR MANAGING ACCESS TO A RESOURCE SHARED BY A PLURALITY OF MOBILE MACHINES

TECHNICAL FIELD

This invention relates generally to a system and method for managing a resource in a mobile machine system, and more particularly, to a system and method for managing access to a resource having an entry point, and an exit point, shared by a plurality of mobile machines.

BACKGROUND ART

Caterpillar Inc. of Peoria, Ill., manufactures off-road mining mobile machines. For example, the Caterpillar 777C is an off-road mining truck. In commonly owned U.S. Pat. No. 5,390,125, Kyrtsos et al disclose an autonomous mobile machine system for use with a mining mobile machine such as a 777C truck. Such an autonomous mobile machine system may be used, for example, to implement an autonomous mining operation. For example, a plurality of autonomous dump trucks can haul rock from an excavation site to a crusher site in an open pit mining operation.

In addition, in commonly owned U.S. Pat. No. 5,586,030, Kemner et al disclose a system using a queuing technique to manage a single input, fixed position resource such as a wheel loader. However, in a mining system, there are several resources, such as hopper loaders, which may fail to load the mobile machine properly. In more general terms, the mobile machine may not successfully access the resource. For example, in a load resource having a hopper loader, if the load chute jams, or the hopper runs out of load material, then the mobile machine will not receive a full load. In cases such as this, where there was not a successful access of the resource, the mobile machine either waits at the load resource until the problem is corrected, or continues to its next destination with a partial load. Either alternative is an inefficient use of valuable resources. There needs to be a system or method in place which can instruct the mobile machine as to its next action based on a current condition of the mining site.

The present invention is directed to overcoming one or more of the problems as set forth above.

DISCLOSURE OF THE INVENTION

In one aspect of the present invention, a system for managing a resource shared by at least one mobile machine is provided. The system includes a queue manager on each mobile machine. The queue manager is adapted to generate a queue position request signal in response to a mobile machine approaching the resource. The queue manager also determines if access of the resource by the mobile machine is unsuccessful and responsively generates a access status signal. The system also includes a resource manager adapted to establish a queue to control access to the resource. The resource manager receives a queue position request signal and responsively determines a queue position. The resource manager also receives an access status signal.

In another aspect of the present invention a method for managing a resource shared by at least one mobile machine is provided. Each of the mobile machines includes a queue manager to generate a queue position request signal when the mobile machine approaches the resource. The method includes the steps of establishing a queue to control access to the resource, receiving the queue position request signal from the mobile machine, responsively determining a queue position, and communicating the queue position to the mobile machine. The method also includes the steps of determining if access to the resource by the mobile machine is unsuccessful and generating a queue reentry request signal.

BRIEF DESCRIPTION OF THE DRAWINGS

FIG. 3 is a high level flow diagram illustrating a method of managing a resource having a reentry path.

BEST MODE FOR CARRYING OUT THE INVENTION

Figure 1:
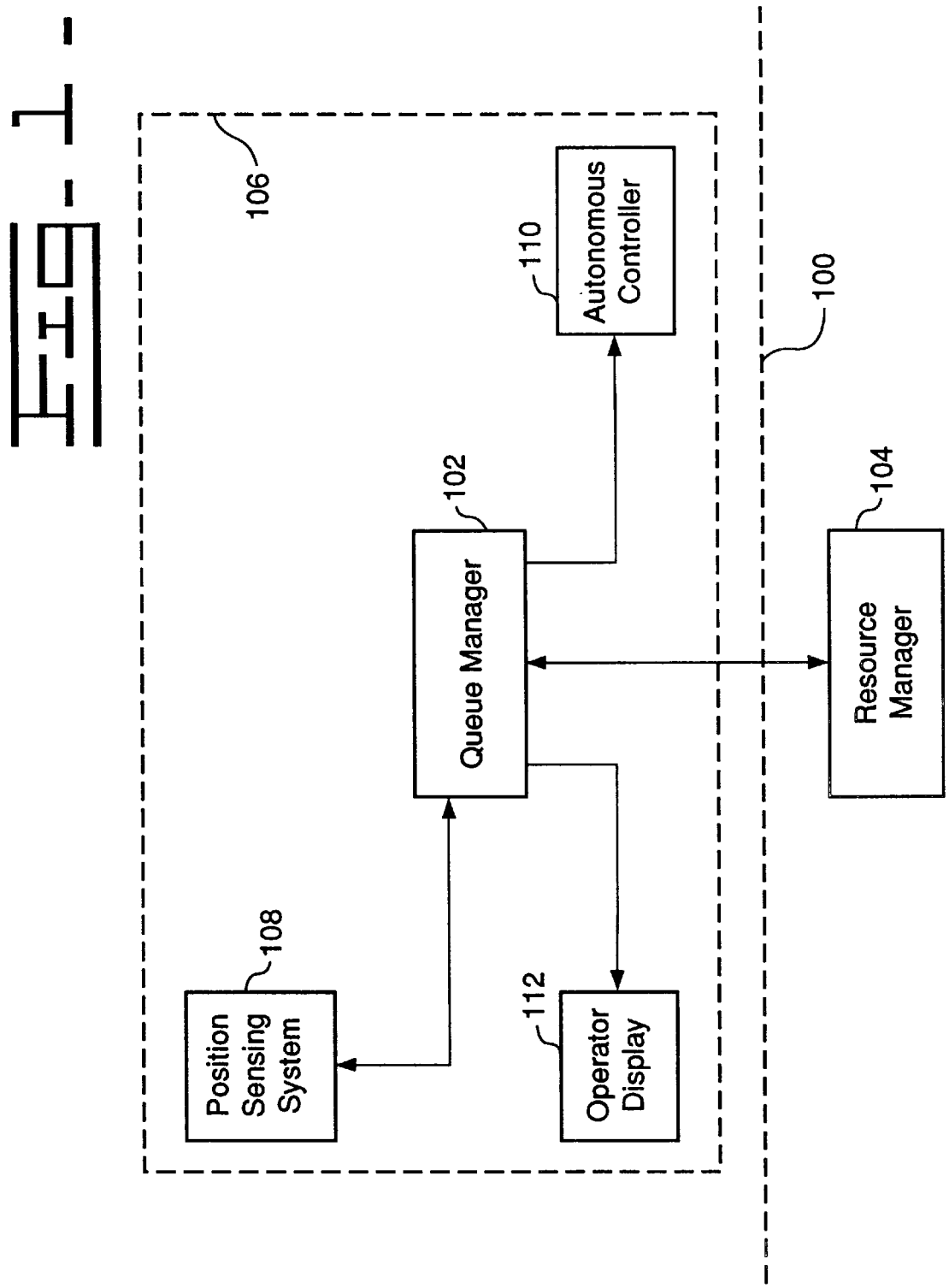
FIG. 1 is a high level block diagram illustrating an embodiment of the present invention.
Figure 2:
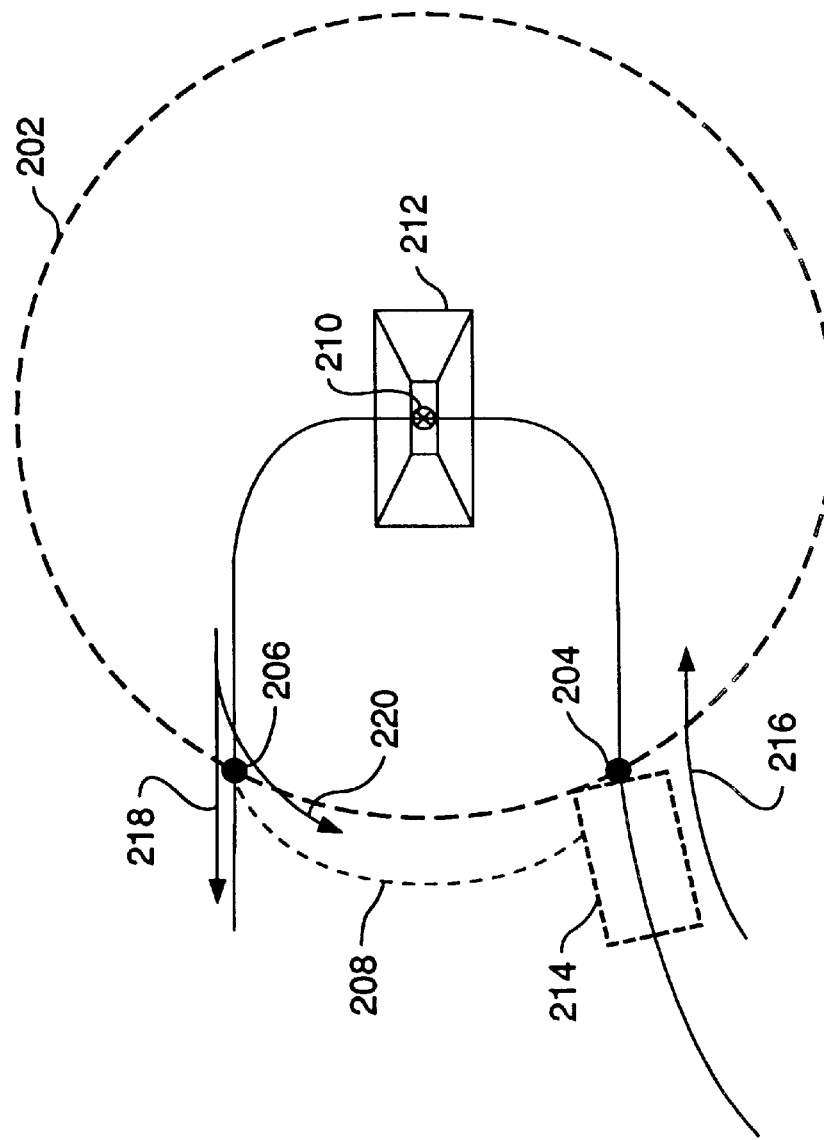
FIG. 2 is an diagrammatic illustration of a resource including a load hopper, an entry point, an exit point, and a reentry path.

With reference to FIGS. 1 and 2, the present invention provides a system 100 for managing a resource 202 shared by at least one mobile machine 106. The resource 202 has an entry point 204, an exit point 206, and a reentry path 208.

A queue manager 102 is located on each mobile machine 106. The queue manager 102 generates a queue position request signal when the mobile machine 106 approaches the resource 202. The queue manager 102 determines if access to the resource 202 is unsuccessful. The queue manager 102 will responsively Generate a access status signal. The queue manager 102 will receive a access command signal.

A resource manager 104 establishes a queue 214 to control access to the resource 202. The resource manager 104 receives the queue position request signal and responsively determines a queue position in the queue for the approaching mobile machine 106. The resource manager 104 then communicates a queue position signal to the mobile machine 106. The resource manager 104 receives a access status signal and responsively generates a access command signal.

A position sensing system 108 determines the position of a predetermined point on the mobile machine 106. The position sensing system 108 may include a Global Positioning System (GPS), a laser positioning system, an inertial navigation unit, or any suitable system or combination thereof.

The system 100 may operate in an autonomous or manual mode. In the autonomous system embodiment, an autonomous controller 110 receives signals from the position sensing system 108 and the queue manager 102 and autonomously operates the mobile machine 106 along a predetermined path. In the manual system embodiment, an operator display 112 displays information to assist an operator during operation of the mobile machine 106.

In the preferred embodiment, the resource 202 includes a hopper loader 212. The resource manager 104 controls the flow of mobile machines 106, such as dump trucks, through resources located at a work site. The resource manager 104 acts like a supervisor, controlling access to the resource 202, and tracking the progress of the mobile machines 106 as they pass through the resource 202. In the preferred embodiment in the example described herein, the resource manager 104 is located at a base station (not shown) near an open pit mining operation, and is a general purpose computer or workstation. The features of the resource manager 104 are embodied in software programmed into the computer.

With reference to FIG. 2 in the preferred embodiment, the resource 202 is a load site which contains the hopper loader 212. The resource 202 has at least one entry point 204, at least one exit point 206, at least one load point 210, and at least one reentry path 208. Arrows 218, 220, 222 indicate the direction of travel of the mobile machines 106 through the resource 202.

The resource manager 104 establishes the queue 214 for the entry point 204 of the resource 202. As a mobile machine 106 approaches the resource 202, the queue manager 102 requests a queue position from the resource manager 104. The resource manager 104 assigns the approaching mobile machine 106 a position within the queue 214 and sends a queue position signal to the mobile machine 106.

When the hopper loader 212 is ready to receive a mobile machine 106, it will send a request to the resource manager 104. The resource manager 104 then determines when the path to the load point 210 of the hopper loader 212 is clear. When the path is clear, the resource manager 104 sends a signal to the mobile machine 106 in the first position of the queue 214 indicating the location of the load point 210. The mobile machine 106 in the first position of the queue 214 then leaves the queue 214 and approaches the load point 210. At the load point 210 the mobile machine 106 is loaded.

When the hopper loader 212 is finished loading the mobile machine 106, the queue manager 102 will determine if the load was unsuccessful. The queue manager 102 will send a access status signal to the resource manager 104. Based on the data disclosed in the access status signal, the resource manager 102 will generate a access command signal and send it to the queue manager 104. The data in the access command signal will instruct the mobile machine 106 as to what its next action should be.

A method of managing a resource 202, according to one embodiment of the present invention, is illustrated in FIG. 3. In a first control block 302, the resource manager 104 establishes the queue 214 corresponding to the entry point 204, in order to control access to the resource 202. In a second control block 304, the resource manager 104 receives a queue position request signal from an approaching mobile machine 106. In a third control block 306, the resource manager 104 determines a queue position for the mobile machine 106, and in a fourth control block 308 the resource manager 104 communicates a queue position signal to the mobile machine 106.

In a first decision block 310, a determination is made as to whether the access of the resource 202 is unsuccessful. If access is successful then, in a fifth control block 312, the method is complete and the mobile machine 106 leaves the resource 202. If access of the resource is unsuccessful then, in a sixth control block 314, a queue reentry request signal is received, and the steps of determining a queue position, communicating the queue position to the mobile machine 106, and determining if the access of the resource 202 is unsuccessful is repeated.

Industrial Applicability

With reference to the drawings and in operation, the present invention provides a system and method for managing access to a resource 202 and determining what to do if the access was unsuccessful. In the preferred embodiment, during initialization, the resource manager 104 will access a database containing information regarding the configuration of resource 202. For example, referring again to FIG. 2, the resource manager 104 determines that the resource 202 includes one hopper loader 212, one entry point 204, one exit point 206, one reentry path 208, and one load point 210. Based on this information, the resource manager 104 establishes a queue 214 for the entry point 204. As a mobile machine 106 approaches the resource 202 the queue manager 102 generates and sends a queue position request signal to the resource manager 104. The resource manager 104 will determine a queue position and send a queue position signal to the mobile machine 106. The queue position signal will contain the information of the physical location of the first position in the queue 214, e.g., the entry point 204 in the resource 202, and the number of mobile machines currently in the queue 214, e.g., zero. The queue manager 102 on the mobile machine 106 will use the information contained in the queue position signal to determine where to stop the mobile machine 106 to await further instructions from the resource manager 104.

When the hopper loader 212 is ready to receive a mobile machine 106, the hopper loader 212 will send a request load machine signal to the resource manager 104. The request load machine signal will contain data indicating the location of the load point 210 for the hopper loader 212. Upon receiving the request for a mobile machine 106, the resource manager 104 will determine if the route to the load point 210 is clear. For example, no other mobile machines are located on the route. Once the route is clear, the resource manager 104 will send a depart position signal to the first mobile machine 106 in the queue 214. This depart position signal will include data disclosing the load point 210, and the route required to get to the load point 210. Upon receiving the depart position signal, the mobile machine 106 will leave the queue 214 and travel to the load point 210, while sending a leave position signal to the resource manager 104. Once the resource manager 104 receives the leave position signal from the mobile machine 106, it will update the positions of any remaining mobile machines in the queue 214. Upon arrival at the load point, the mobile machine 106 will send an arrive load point signal back to the resource manager 104. The resource manager 104 will then send a load mobile machine ready signal to the hopper loader 212 to indicate that the mobile machine 106 is ready for loading.

Once the hopper loader 212 has completed loading it will send a loading complete signal to the queue manager 104. At this time a determination is made if the load is unsuccessful. The load may be unsuccessful for several reasons, e.g., the load chute (not shown) of the hopper loader 212 is jammed, or the hopper loader 212 is out of material. The determination of whether the load is unsuccessful can be made in several ways, e.g., visual inspection, the use of level sensors, or, in the preferred embodiment, a payload monitor (not shown). After receiving the load complete signal, the queue manager 102 will determine if the load was successful. The queue manager 102 then sends an access status signal to the resource manager 104. The resource manager 102 will determine the next action the mobile machine 106 will take, depending on the information in the access status signal. If the access status signal indicates the load was successful, the resource manager 104 will send an access command signal commanding the mobile machine 106 to leave the resource. The mobile machine 106 will begin to leave the load point, and the queue manager 102 will send a leave load point signal to resource manager 104. After leaving the resource, e.g., passing the exit point 206, the queue manager 102 will send a leave load resource signal to the resource manager 104.

If the load is determined to be unsuccessful, the queue manager 102 will send an access status signal to the resource manager 104 that indicates the load failed. The resource manager 104 will send an access command signal to the queue manager 102 commanding the mobile machine 106 to reenter the queue 214. As the mobile machine 106 leaves the load point 210, the queue manager 102 will send a leave load point signal to the resource manager 104, then send a queue reentry request signal to the resource manager 104, and travel through a reentry path 208 to the queue 214. The resource manager 104 will then repeat the process of controlling the reentry of the mobile machine 106 into the queue 214 and controlling access to the hopper loader 212.

The determination as to what action to take when the initial resource access is unsuccessful is a site specific, and resource dependent decision. For example, there are at least three alternatives available when the hopper loader 212 fails to properly load the mobile machine 106. One alternative is, as discussed, to leave the hopper loader 212 and reenter the queue. In the second alternative, the mobile machine 106 could also be instructed to maintain its position until the problem is fixed, and loading is completed. The third option is to instruct the mobile machine 106 to leave the resource 202 and go perform another task. The alternatives vary due to the type of problem encountered during the load, and the strategy chosen by the site as to which is the most desired alternative for the resource.

Other aspects, objects, and features of the present invention can be obtained from a study of the drawings, the disclosure, and the appended claims.

I claim:

1. A system for managing a resource shared by at least one mobile machine, comprising:

a queue manager located on each of said at least one mobile machine, said queue manager being adapted to generate a queue position request signal in response to one of said at least one mobile machine approaching said resource, and determine if access of said resource is unsuccessful and responsively generate a queue reentry request signal; and a resource manager adapted to establish a queue to control access to said resource in response to receiving at least one of said queue position request signal and said queue reentry request signal, responsively determine a queue position, and responsively communicate a queue position signal to said one of said at least one mobile machine.

2. A system, as set forth in claim 1, wherein said resource manager is adapted to determine a resource configuration.

3. A system, as set forth in claim 1, wherein said resource manager is adapted to allow said queue access to said resource in response to a condition of said resource.

4. A system, as set forth in claim 1, wherein said queue position signal includes data disclosing an entry point position and data disclosing the number of mobile machines in said queue, and wherein said queue manager is adapted to determine said queue position in response to said queue position signal.

5. A system, as set forth in claim 1, wherein said resource includes a hopper loader.

6. A system, as set forth in claim 5, wherein said resource manager is adapted to determine a configuration of said hopper loader.

7. A system, as set forth in claim 1, wherein said resource manager includes a payload monitor.

8. A system, as set forth in claim 1, wherein said queue manager includes a payload monitor.

9. A system, as set forth in claim 1, wherein said resource includes an entry point, an exit point, and a reentry path.

10. A system, as set forth in claim 1, wherein said resource manager is adapted to selectively deliver a blocking signal, said blocking signal being adapted to prevent said mobile machines in said queue from accessing said resource.

11. A method for managing a resource shared by at least one mobile machine, each of said at least one mobile machine including a queue manager adapted to generate a queue position request signal in response to said each of said at least one mobile machine approaching said resource, said resource including an entry point, including the steps of:

establishing a queue to control access to said resource;

receiving said queue position request signal from one of said at least one mobile machine approaching said resource;

responsively determining a queue position in said queue;

communicating said queue position to said one of said at least one mobile machine;

determining if access to said resource is unsuccessful and responsively delivering a queue reentry request signal; and repeating the steps of determining a queue position, communicating said queue position, and determining if access to said resource is unsuccessful in response to receiving said queue reentry request signal.

12. A method, as set forth in claim 11, including the step of determining a configuration of said resource.

13. A method, as set forth in claim 11, including the step of defining said resource as including a hopper loader.

14. A method, as set forth in claim 11, including the step of determining if a load access is unsuccessful in response to a signal received from a payload monitor.

15. A method, as set forth in claim 11, wherein receiving said queue position request signal includes the step of assigning a next available queue position to said one of said at least one mobile machine.

16. A method, as set forth in claim 11, wherein responsively determining a queue position includes the step of determining said queue position in response to a determination of the number of mobile machines in said queue, and a location of said entry point.

17. A method, as set forth in claim 11, including the steps of:

determining a condition of said resource being available to receive said one of said at least one mobile machine; and sending said one of at least one mobile machine to access said resource, said one of at least one mobile machine being in a first position of said queue.

18. A system for managing a resource shared by at least one mobile machine, comprising:

a queue manager located on each of said at least one mobile machine, said queue manager being adapted to generate a queue position request signal in response to one of said at least one mobile machine approaching said resource, and determine if access of said resource is unsuccessful and responsively generate an access status signal; and a resource manager adapted to establish a queue to control access to said resource in response to receiving said queue position request signal and, responsively determine a queue position, communicate a queue position signal to said one of said at least one mobile machine, receive said access status signal and responsively generate an access command signal.

19. A system, as set forth in claim 18, wherein said queue manager is adapted to receive said access command signal and enable said at least one mobile machine to leave said resource in response to receiving said access command signal.

20. A system, as set forth in claim 18, wherein said queue manager is adapted to receive said access command signal and enable said at least one mobile machine to continue accessing said resource in response to receiving said access command signal.

21. A system, as set forth in claim 18, wherein said queue manager is adapted to receive said access command signal and enable said at least one mobile machine to reenter said queue in response to receiving said access command signal.

22. A system for managing a resource shared by at least one mobile machine, comprising:

- a queue manager located on each of said at least one mobile machine, said queue manager being adapted to generate a queue position request signal in response to one of said at least one mobile machine approaching said resource, and determine if access of said resource is unsuccessful and responsively generate an access status signal; and
- a resource manager adapted to establish a queue to control access to said resource in response to receiving said queue position request signal and responsively determine a queue position, and communicate a queue position signal to said one of said at least one mobile machine, and receive said access status signal and responsively deliver an access command signal, said one of said at least one mobile machine being adapted to leave said resource in response to receiving said access command signal.

23. A system for managing a resource shared by at least one mobile machine, comprising:

- a queue manager located on each of said at least one mobile machine, said queue manager being adapted to generate a queue position request signal in response to one of said at least one mobile machine approaching said resource, and determine if access of said resource is unsuccessful and responsively generate an access status signal; and
- a resource manager adapted to establish a queue to control access to said resource in response to receiving said queue position request signal and responsively determine a queue position, and communicate a queue position signal to said one of said at least one mobile machine, and receive said access status signal and responsively deliver an access command signal, said one of said at least one mobile machine being adapted to continue to access said resource in response to receiving said access command signal.

\* \* \* \* \*